United States Patent
Kang

(10) Patent No.: US 8,405,878 B2
(45) Date of Patent: Mar. 26, 2013

(54) APPARATUS AND METHOD OF FORMING IMAGES

(75) Inventor: Ki-min Kang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 772 days.

(21) Appl. No.: 12/546,906

(22) Filed: Aug. 25, 2009

(65) Prior Publication Data

US 2010/0097659 A1  Apr. 22, 2010

(30) Foreign Application Priority Data

Oct. 22, 2008  (KR) .................. 10-2008-0103628

(51) Int. Cl.
*H04N 1/405* (2006.01)
(52) U.S. Cl. ..................................... 358/3.09; 358/3.06
(58) Field of Classification Search ............ 358/1.7–1.9, 358/2.1, 3.01–3.02, 3.1–3.14, 3.21–3.24, 358/400, 406, 500, 504, 3.06–3.09
See application file for complete search history.

(56) References Cited

U.S. PATENT DOCUMENTS

| 6,175,374 | B1 * | 1/2001 | Broddin et al. | 347/112 |
| 6,637,851 | B2 * | 10/2003 | Velde et al. | 347/15 |
| 7,277,649 | B2 | 10/2007 | Hirobe et al. | |
| 8,085,436 | B2 * | 12/2011 | Couwenhoven et al. | 358/1.9 |

FOREIGN PATENT DOCUMENTS

| JP | 2004-294535 | 10/2004 |
| JP | 2006-184301 | 7/2006 |

OTHER PUBLICATIONS

Notice of Allowance issued in KR 10-2008-0103628 dated Feb. 6, 2013.

* cited by examiner

*Primary Examiner* — Thomas D Lee
*Assistant Examiner* — Stephen M Brinich
(74) *Attorney, Agent, or Firm* — Stanzione & Kim, LLP

(57) ABSTRACT

An image forming apparatus which provides a plurality of developers that have different densities for each color, and an image forming method thereof. The image forming method may include detecting a remaining amount of a first developer; and forming an image by expressing a gray scale of inputted data according to a multi-bit halftoning process using a second developer that is similar to the first developer in color and higher than the first developer in density if the remaining amount of the first developer is a preset value or less.

21 Claims, 5 Drawing Sheets

FIG. 2
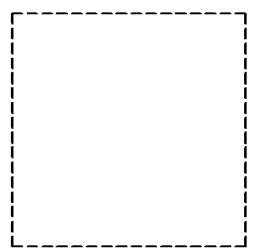
(A)
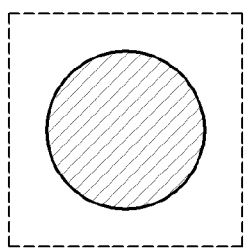
(B)
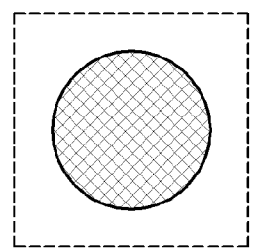
(C)
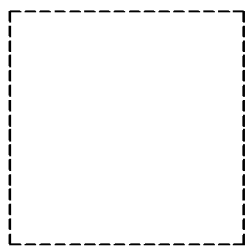
(D0)
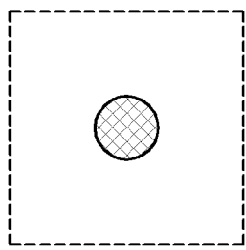
(D1)
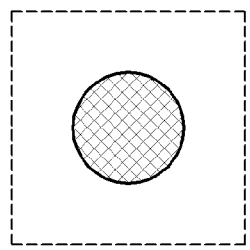
(D2)
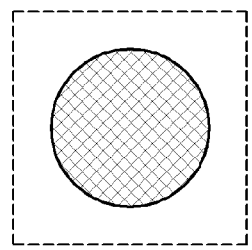
(D3)

APPARATUS AND METHOD OF FORMING IMAGES

CROSS-REFERENCE TO RELATED APPLICATIONS

This application claims priority from Korean Patent Application No. 10-2008-0103628, filed on Oct. 22, 2008, in the Korean Intellectual Property Office, the disclosure of which is incorporated herein by reference in its entirety.

BACKGROUND

1. Field of the Invention

Apparatuses and methods consistent with the present general inventive concept relate to image forming apparatuses to form an image on a print medium by use of a developer, and image forming methods thereof, and more particularly, to an image forming apparatus which is provided with a plurality of developers different in densities and colors, and an image forming method thereof.

2. Description of the Related Art

If data including image information are input, an image forming apparatus forms a visible image on a print medium using a developer such as ink or toner. The image forming apparatus performs a halftoning process to express a difference in brightness included in the image information as an image.

The image forming apparatus forms an image on a print medium in two ways: forming dots using a developer on a print medium and a different type of process that does not form dots using a developer. The halftoning process converts input data into a gray-scale image and then into a binary image with respect to whether to form dots or not. When a user visually receives the final image formed by the halftoning process, the user can recognize it by continuous differences in brightness thereof, by causing a spatial integration as his/her vision and brain react.

The image forming apparatus forms images using developers each having a single density, causing the halftoning process to be segmented and complicated. To solve this problem, a technique to provide a plurality of developers having similar colors but different densities to an image forming apparatus and properly use each developer in accordance with brightness of an image has been suggested. The image forming apparatus divides input data with respect to channels corresponding to respective developers based on different densities, forms an image for each channel using the corresponding developer, and overlaps the formed images, to thereby form a halftone image.

However, any one of the developers having different densities may be used up before others as a result of repeated print operations. The conventional image forming apparatus has difficulty in forming an image using the channel corresponding to the used-up developer, thereby resulting in causing the final image formed on a print medium to be poor in quality.

Taking this into consideration, it is necessary to maintain the image quality or at least keep deterioration of the image at a minimum even when any one of the plurality of developers having different densities is used up.

SUMMARY

The present general inventive concept provides an image forming apparatus which includes a plurality of developers having similar colors but different densities, and an image forming method thereof, allowing a halftone image similar in quality to be formed using another developer when one developer is used up or reaches less than a preset amount.

Additional features and/or utilities of the present general inventive concept will be set forth in part in the description which follows and, in part, will be obvious from the description, or may be learned by practice of the present general inventive concept.

The foregoing and/or other features and utilities of the present general inventive concept are achieved by providing an image forming method of an image forming apparatus, the image forming method including: detecting a remaining amount of a first developer; and forming an image by expressing a gray scale of inputted data according to a multi-bit halftoning process using a second developer that is similar to the first developer in color and higher than the first developer in density if the remaining amount of the first developer is a preset value or less than the preset value.

The forming the image may include setting a size of dots of the second developer for each step; and forming dots of the second developer in a size set for each step in proportion to the image density of the inputted data.

The forming the image may include forming an image by expressing a gray scale of the inputted data according to a single-bit halftoning process using the first and second developers if the remaining amount of the first developer is not the preset value or less than the preset value.

The forming the image by expressing the gray scale of the inputted data according to the single-bit halftoning process may include dividing the gray scale information of the inputted data into channels corresponding to the first and second developers, respectively; and forming images of the divided channels with the first and second developers and overlapping the images of the channels.

The forming the image may include performing a first process of a multi-bit halftoning process using the second developer if the remaining amount of the first developer is not the preset value or less; and performing a second process of the multi-bit halftoning process with the second developer by increasing the number of halftoning bits rather than the number of halftoning bits in the first process if the remaining amount of the first developer is the preset value or less.

The size of dots of the second developer may increase as the halftoning bits increases.

The foregoing and/or other features and utilities of the present general inventive concept are achieved by providing an image forming apparatus including: a developer supply unit in which a first developer and a second developer that is similar to the first developer in color and higher density than the first developer in density are stored; a detector which detects a remaining amount of the first developer stored in the developer supply unit; and an image forming unit which forms an image by expressing a gray scale of inputted data according to a multi-bit halftoning process using the second developer stored in the developer supply unit.

The image forming unit may set a size of dots of the second developer for each step and forms dots of the second developer in a size set for each step in proportion to the image density of the inputted data.

The image forming unit may form an image by expressing a gray scale of inputted data according to a single-bit halftoning process using the first and second developers if the remaining amount of the first developer is not the preset value and less.

The image forming unit may divide gray scale information of the inputted data into channels corresponding to each of the first and second developers, and forms images of the divided channels with the first and second developers to overlap each other.

The image forming unit may perform a first process of a multi-bit halftoning process which uses the second developer if the remaining amount of the first developer is not a preset value and less, and performs a second process of a multi-bit halftoning process with the second developer by increasing the number of halftoning bits rather than the first process if the remaining amount of the first developer is the preset value and less.

The image forming unit may increase the size of dots of the second developer as the halftoning bits increase.

The foregoing and/or other features and utilities of the present general inventive concept are also achieved by providing an image forming apparatus including: a first developing cartridge which includes a first developer; a second developing cartridge which includes a second developer similar to the first developer in color and higher than the first developer in density; and a controller which is converted from a single-bit halftoning process using the first developer to a multi-bit halftoning process using the second developer.

The first and second developing cartridges may include a first detector and a second detector which detect a remaining amount of the first developer and the second developer, respectively.

A point of time when the single-bit halftoning process is converted into the multi-bit halftoning process is determined on the basis of a value detected by the first detector that detects the remaining amount of the first developer.

The first detector may employ at least one of a photo sensor, a piezo-electric sensor, a torque sensor, an electric-capacity detecting sensor and a dot counting sensor to detect the remaining amount of the first developer.

The image forming apparatus may include at least one of a display apparatus which displays thereon an operation of the image forming apparatus, and an input apparatus which receives a user's input.

The single-bit halftoning process may be converted into the multi-bit halftoning process at a point of time when a user makes a selection with the display apparatus or the input apparatus.

The developing cartridges are detachable and the number of the developing cartridges is at least five.

The foregoing and/or other features and utilities of the present general inventive concept are also achieved by providing an image forming method of an image forming apparatus, the image forming method including: determining a remaining amount of a first developer having a predetermined color; and forming an image according to a multi-bit halftoning process which uses a second developer that is similar to the first developer in color and higher in density than the first developer with respect to a brightness that is a preset value or more among gray scale images corresponding to the color if the first developer is used up.

The image forming apparatus includes a developer in a plurality of colors, and the first developer and the second developer are provided to correspond to at least one of the plurality of colors of the developers.

BRIEF DESCRIPTION OF THE DRAWINGS

The above and/or other features and utilities of the present general inventive concept will become apparent and more readily appreciated from the following description of the embodiments, taken in conjunction with the accompanying drawings of which:

FIG. 2 illustrates dots which are formed by a single-bit halftoning process using respective developers and those which are formed by a multi-bit halftoning process using a second developer, in the image forming apparatus of FIG. 1;

DETAILED DESCRIPTION OF THE EMBODIMENTS

Figure 1:
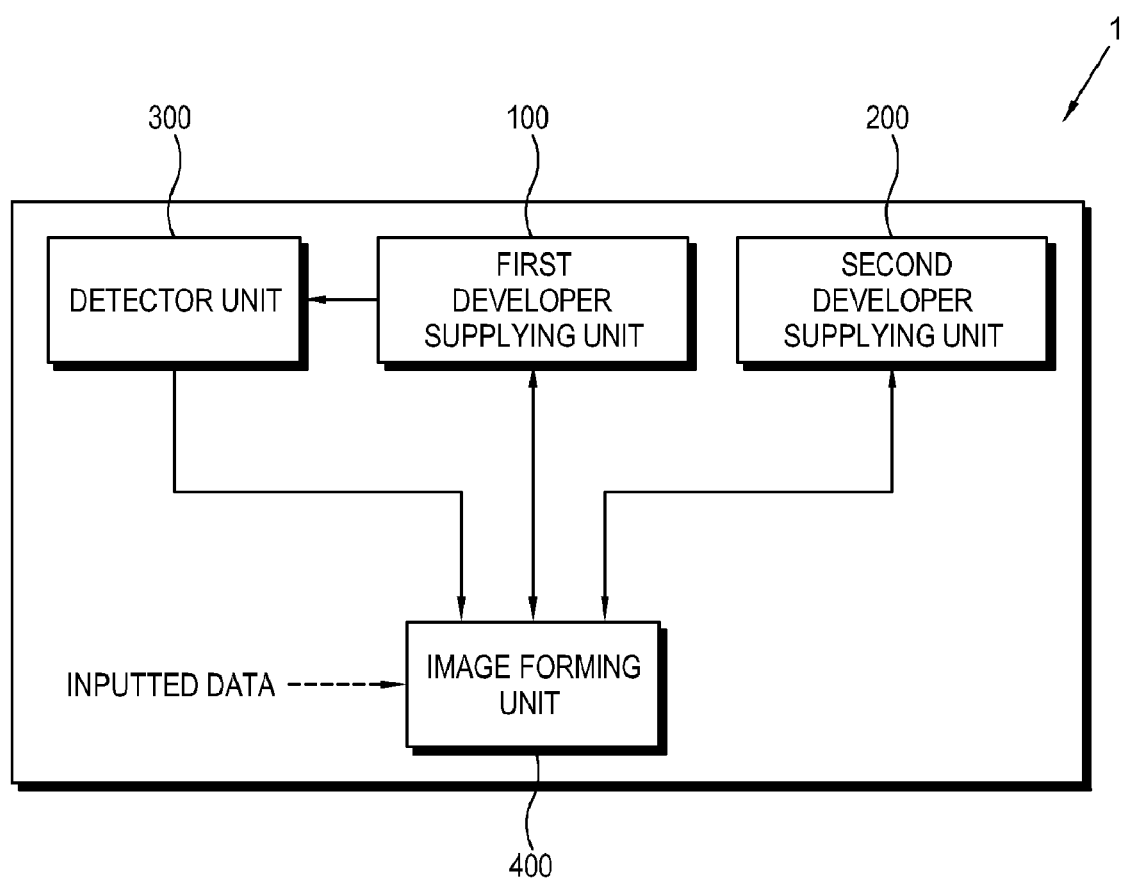
FIG. 1 is a control block diagram of an image forming apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a control block diagram of an image forming apparatus 1 according to an exemplary embodiment of the present general inventive concept. The image forming apparatus 1 may be an electrophotographic laser printer or an inkjet printer, depending upon an image is formed. A developer for the electrophotographic laser printer refers to a toner, and a developer for the inkjet printer refers to an ink. The image forming apparatus may be capable of forming a monotone image in black and white or forming a chromatic image (color).

As shown FIG. 1, the image forming apparatus 1 according to the present exemplary embodiment includes developer supplying units 100 and 200 which supply at least one of a first developer and a second developer, a detector unit 300 which detects the remaining amount of the first developer; and an image forming unit 400 which forms a halftone image according to a multi-bit halftoning process using the second developer when the remaining amount of the first developer is at a preset value and less. The halftone image refers to an image expressing input data in continuous gray levels.

In an embodiment, the image forming apparatus 1 may include a plurality of developer cartridges (not shown), which are detachable. Each developer cartridge includes developers of colors, e.g., cyan, magenta, yellow and black (CMYK). Developer supplying units such as the developer supplying units 100 and 200 may be provided for each color.

Hereinafter, elements of the image forming apparatus 1 will be described in more detail below.

Between the developer supplying units 100 and 200, a first developer supplying unit 100 stores therein the first developer, and a second developer supplying unit 200 stores therein the second developer. The developer supplying units 100 and 200 supply the first and the second developers to the image forming unit 400 so that the image forming unit 400 can form an image on a print medium with respect to the data input into the image forming apparatus 1.

The first and the second developers are substantially identical or similar in color, but they are different in density. According to the present exemplary embodiment, the second developer has a density relatively higher than the first developer. The first and the second developers, if they are similar in color, preferably have a difference in hue angle within 10 degrees of angle.

For example, the second developer may have a color of cyan or magenta while the first developer may have a color of light cyan or light magenta, relatively lower in density than the second developer. These colors are merely by way of example, and other colors similar to each other are also applicable.

Accordingly, the image forming apparatus 1 using the first and the second developers includes a plurality of developer cartridges (not shown), preferably developer cartridges corresponding to developers of at least four colors. Further, the image forming apparatus 1 may include developer cartridges corresponding to developers of at least five colors.

The detector unit 300 detects the remaining amount of the first developer stored in the first developer supplying unit 100, and transmits the detection result to the image forming unit 400. Here, it is possible to set various conditions on which basis the detector unit 300 detects the remaining amount of the first developer. For example, the detector unit 300 may detect the remaining amount of the first developer at a predetermined internal while the image forming apparatus 1 turns on, or may detect the remaining amount during a print operation, i.e., at a point in time when data is input into the image forming unit 400.

To achieve its function described above, the detector unit 300 may employ various configurations. For example, the detector unit 300 may include a photo sensor to detect the amount of the first developer through a transparent window which is formed on a lateral side of the first developer supplying unit 100. The detector unit 300 may further include a piezo-electric sensor mounted inside of the first developer supplying unit 100 to detect a weight of the first developer or the amount of a vibration of the first developer arising out of a vibration plate thereof. The detector unit 300 may employ a torque sensor to detect the remaining amount of the first developer by measuring a driving load by a supply mechanism provided in the first developer supplying unit 100 supplying the first developer to the image forming unit 400.

The detector unit 300 may also employ an electric-capacity detecting sensor to detect the amount of electric charge flowing in a conductive developer. The detector unit 300 may also employ a dot counting sensor which calculates and cumulates the number of printed dots according to the amount of information about print data forming an image thereon, stores the cumulated data in a memory, such as, for example, an electrically erasable programmable read-only memory (EEPROM) provided in a lateral side of the developer cartridge (not shown), and assumes the remaining amount of the developer by estimating the used amount of the developer reversely through expectation of the amount of the developer to be used by assigning a preset weight value.

The image forming unit 400 processes input data and forms a visual image on a print medium with a developer if data including image information is input into the image forming apparatus 1 through a local area network (LAN) or worldwide network, etc.

If input data is based on red, green & blue (RGB) colors, the image forming unit 400 converts the RGB colors into CMYK colors. The image forming unit 400 divides the input data for corresponding colors, and forms a halftone image with respect to each color. Again, the halftone image refers to a gray scale image according to brightness information included in the input data, i.e. an image expressed in continuous gray levels with a developer of each color. The halftone images in respective colors overlap, to thereby form the final image on a print medium.

The image forming unit 400 according to the present exemplary embodiment incorporates a configuration for processing the input data, a configuration for forming a visual image for the processed data with a developer and a configuration for controlling these functions, but not is limited thereto. Alternatively, these functions may be realized as separate elements.

The image forming unit 400 determines whether the remaining amount of the first developer detected by the detector unit 300 is a preset value and less. Here, the preset value may vary depending on various conditions including the characteristics of the image forming apparatus 1.

If the remaining amount of the first developer detected by the detector unit 300 is determined to exceed the preset value, the image forming unit 400 receives the first and the second developers from the first and second developer supplying units 100 and 200, and performs single-bit halftoning processes to form halftone images with the respective developers.

If the remaining amount of the first developer detected by the detector unit 300 is determined to be the preset value or less, e.g., if the remaining amount of the first developer is approximately 10 to 20 percent of the total amount of the first developer, the image forming unit 400 receives the second developer from the second developer supplying unit 200 and performs a multi-bit halftoning process to form a halftone image with the second developer.

Hereinafter, the single-bit halftoning process and the multi-bit halftoning process will be described.

By way of example, a mono-tone image is represented in black and white, and also as a gray scale according to the brightness thereof. If the brightness value of each pixel is expressed in 256 levels: from zero to 255, wherein "255" refers to a white color and "zero" to a black color. Colors in between zero and 255 are expressed in gray scales depending on the difference in brightness values. Such an image is called a gradient image, and a halftoning process refers to a process of converting the gradient image into a binary image.

The single-bit halftoning process has values of zero and 1, and represents two gray scales: either forming dots with a developer or not forming dots with the developers. That is, the single-bit haftoning process expresses two levels of zero and 255.

The multi-bit halftoning process may express a plurality of gray scales, i.e., brightnesses in between zero and 255 as well as of zero and 255. If the number of halftoning bits is N, the 2N number of gray scales may be expressed.

For example, if N=2, $2^2$ gray scales, i.e. four gray scales, may be expressed: then four levels such as binary numbers [00, 01, 10, 11] or decimal numbers [0, 1, 2, 3] may be expressed. Hereinafter, the present exemplary embodiment will be described, assuming that N=2 and the levels are expressed in decimal numbers, but which does not limit the spirit of the present general inventive concept.

If N=2, levels [0], [3] of the multi-bit halftoning process correspond to levels [0], [1] of the single-bit halftoning process, which indicate the brightness values of 255 and zero. That is, at level [0] of the multi-bit halftoning process, dots are not formed by the developer. At level [3], dots are formed by the developer.

At levels [1], [2], which are intermediate levels of the multi-bit halftoning process, dots are formed by the developer, corresponding to predetermined values in between the brightness values 255 and zero. A method of forming dots, corresponding to predetermined brightness values in between 255 and zero, may be various. For example, the sizes of dots are set for each level, but which is merely an example, and is not limited thereto.

According to the multi-bit halftoning process according to the present exemplary embodiment, the dots are formed differently in size, corresponding to each level of [0, 1, 2, 3] within a unit matrix formed on a print medium. The dots are the largest at level [3], and become smaller at levels [2] and [1]. At level [0], no dot is formed.

Hereinafter, the processes of forming dots according to the single-bit halftoning process using the first and the second developers and the multi-bit halftoning process using the second developer will be described with reference to FIG. 2. As an example, it is assumed that the number of halftoning bits in the multi-bit halftoning process is 2, but this does not limit the spirit of the present general inventive concept.

FIG. 2 illustrates dots which are formed by the single-bit halftoning process using respective developers and the multi-bit halftoning process using the second developer.

(A), (B) and (C) in FIG. 2 refer to dots formed by the single-bit halftoning process using the first and the second developers, i.e., based on levels [0, 1].

(A) corresponds to level [0], in which no dot is formed.

(B) shows a dot formed by the first developer and (C) shows a lot formed by the second developer, both at level [1]. The dots in (B) and (C) are equal in size but they are different in density. That is, each developer forms the dots different in density.

That is, if an image is formed by the first and the second developers, the image formed by the first developer is brighter than the image formed by the second developer. Accordingly, it is preferable to divide input data as per brightness levels and form a brighter image by the first developer and form a darker image by the second developer.

To perform the single-bit halftoning process using the developers, the image forming unit 400 divides the input data into channels corresponding to the respective developers, forms an image of each channel corresponding to each developer and overlaps the formed images to form a halftone image. A method of dividing the channels for the single-bit halftoning process may vary, and the foregoing exemplary embodiment does not limit the spirit of the present general inventive concept.

(D0), (D1), (D2) and (D3) in FIG. 2 show dots formed by the multi-bit halftoning process using the second developer, i.e., dots formed by the second developer for each of levels [0, 1, 2, 3].

(D0) corresponds to level [0], in which no dot is formed.

(D3) corresponds to level [3] at which a dot is formed by the second developer. If the number of halftoning bits in the multi-bit halftoning process is 2, the multi-bit halftoning process produces the same result as the result of level [1] of the single-bit halftoning process, at level [3]. Accordingly, (D3) and (C) show the same image.

(D1) corresponds to level [1] while (D2) corresponds to level [2]. The dot in (D2) is smaller in size than that of the dot in (D3) and larger in size than that of the dot in (D1). As dots are formed by the second developer as in (D1) and (D2), brightness values in between 255 and zero may be expressed by each level. That is, the dot in (D2) may represent brightness higher than the dot in (D3), and the dot in (D1) may represent brightness higher than the dot in (D2).

With the foregoing method, the image forming unit 400 may express gray scales only with the second developer without using the first developer.

The image forming unit 400 may selectively perform one of the single-bit halftoning process using the first and the second developers or the multi-bit halftoning process using the second developer in order to form a halftone image for each color, and form the final image on a print medium.

Figure 3:
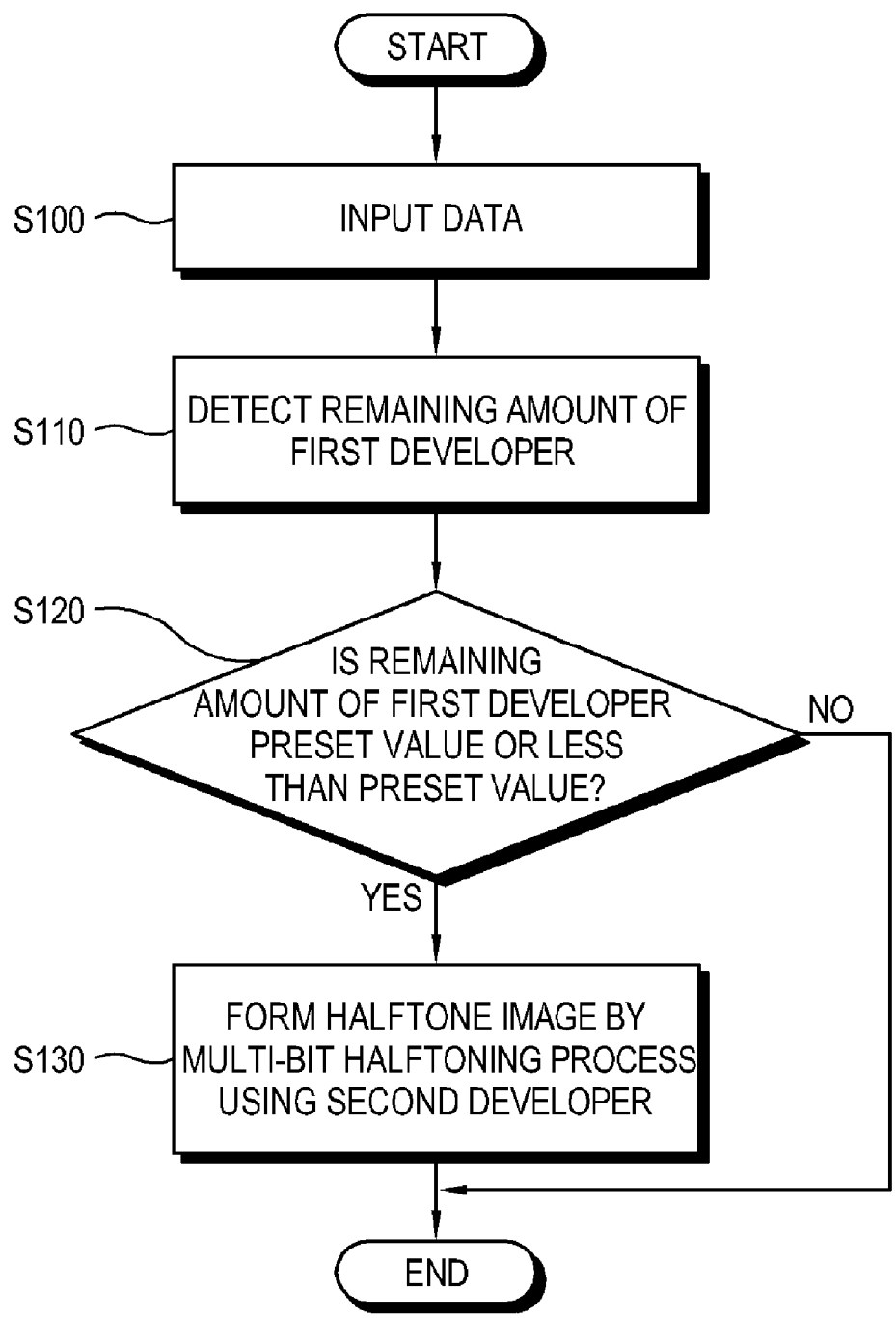
FIG. 3 is a control flowchart which schematically describes a process of forming a halftone image, depending on the remaining amount of a first developer, in the image forming apparatus of FIG. 1.

With the foregoing configuration, a process of the image forming apparatus 1 forming a halftone image with input data will be described with reference to FIG. 3. FIG. 3 is a control flowchart of the halftone image forming process.

As shown in FIG. 3, if a print operation is initiated, image data are input into the image forming apparatus 1 at operation S100. The detector unit 300 detects the remaining amount of the first developer and transmits the detection result to the image forming unit 400 at operation S110.

The image forming unit 400 determines whether the remaining amount of the first developer detected by the detector unit 300 is a preset value or less than the preset value at operation S120. If it is determined that the remaining amount of the first developer is the preset value or less than the preset value, the image forming unit 400 forms a halftone image according to the multi-bit halftoning process using the second developer at operation S130.

With respect to the present exemplary embodiment, the operation S110 of detecting the remaining amount of the first developer by the detector unit 300 and the operation S120 of determining whether the remaining amount of the first developer detected by the detector unit 300 is the preset value or less than the preset value has been described. However, if necessary, the operation S130 of performing the multi-bit halftoning process may be initiated directly as designated by the user.

A user may select a particular point of time at which he/she determines that an image should be formed by the multi-bit halftoning process using the second developer. For example, a user may set an automatic conversion to the multi-bit halftoning at a certain time when the image forming apparatus 1 is used, or depending upon a certain print pattern desired, etc.

Otherwise, an additional developer cartridge (not shown) is provided so that a user may set a conversion to the multi-bit halftoning process by selecting a certain point of time to increase or reduce the available amount of the developer. This process may be optional. Not only the remaining amount of the first developer but also the remaining amount of the second developer may be determined in order to select the multi-bit half toning process for printing an image with the second developer.

For conversion to the multi-bit halftoning process at a predetermined point of time, a display apparatus which displays a current state or enables a user to select the state, or an input apparatus which is provided to receive a user's input through the display apparatus, may be additionally provided.

Figure 4:
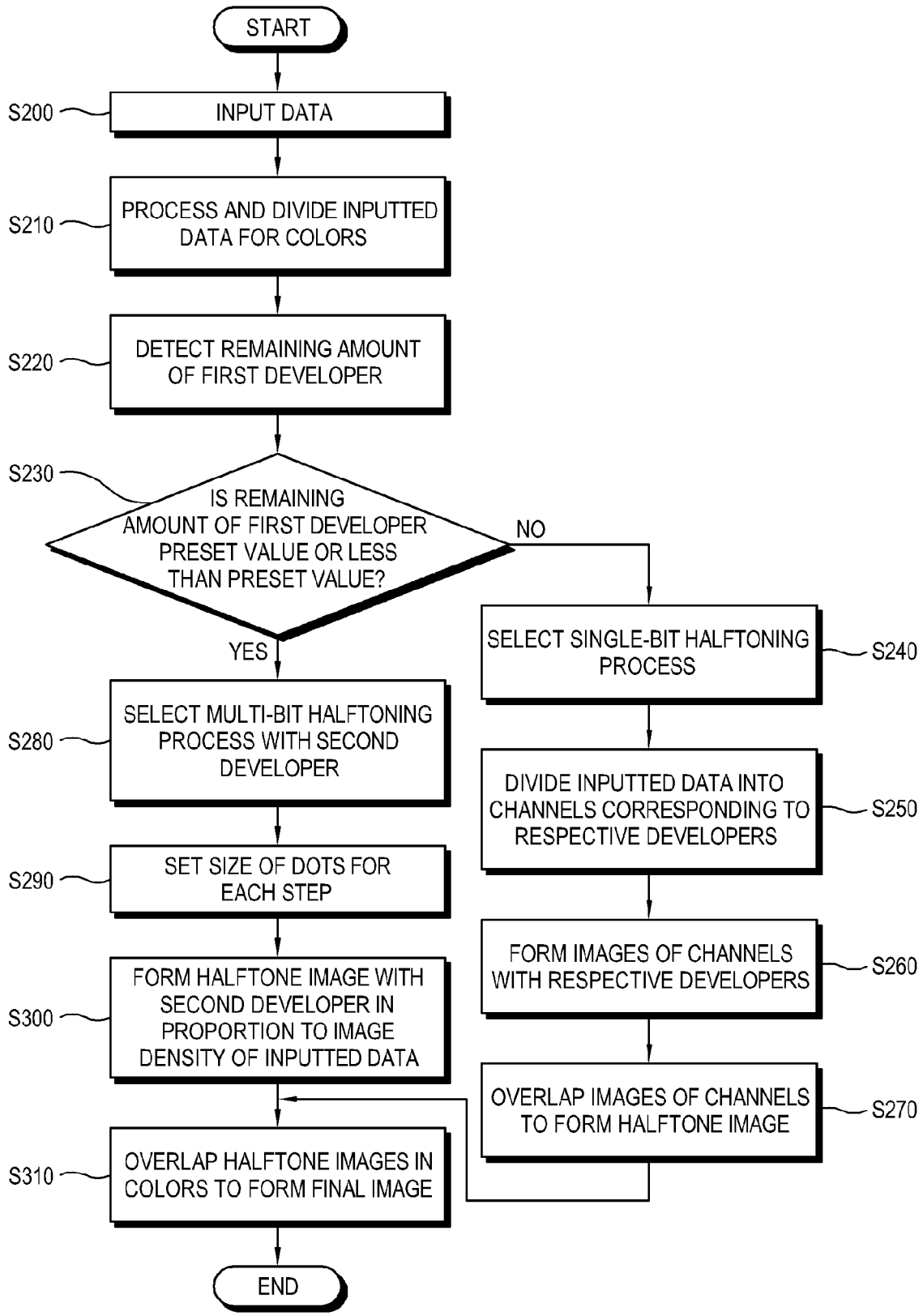
FIG. 4 is a control flowchart which describes a process of selectively applying either of a single-bit halftoning process or a multi-bit halftoning process based on the remaining amount of the first developer, in the image forming apparatus of FIG. 1.

Hereinafter, a process of forming the final image by selecting the single-bit halftoning process or the multi-bit halftoning process depending on the remaining amount of the first developer in the image forming apparatus 1, according to the present exemplary embodiment, will be described with reference to FIG. 4. FIG. 4 is a control flowchart of the image forming process.

As shown in FIG. 4, data is input into the image forming apparatus 1 at operation S200. The image forming unit 400 converts RGB colors of the input data into CMYK colors corresponding to the developers and divides the data for each color at operation S210. The image forming unit 400 initiates a halftone image forming process for each color. Hereinafter, the halftone image forming process for input data for a black color will be described.

The detector unit 300 detects the remaining amount of the first developer at operation S220, and the image forming unit 400 determines whether the remaining amount of the first developer is the preset value or less than the preset value at operation S230.

The image forming unit 400 selects the single-bit halftoning process using each developer if it is determined that the remaining amount of the first developer is not the preset value or less at operation S240. Meanwhile, the image forming unit 400 selects the multi-bit halftoning process using the second developer if it is determined that the remaining amount of the first developer is the preset value or less than the preset value at operation S280.

Hereinafter, each halftoning process will be described.

If the single-bit halftoning process is selected at operation S240, the image forming unit 400 divides the input data for the black color into channels for each developer at operation S250. For example, the image forming unit 400 divides the input data into a first channel corresponding to the first developer and a second channel corresponding to the second developer based on the brightness values of the input data.

The image forming unit 400 forms an image for each channel with each of the respective developers at operation S260. That is, the image forming unit 400 forms the image for the first channel with the first developer, and the image for the second channel with the second developer.

The image forming unit 400 overlaps the images for the channels and forms a halftone image at operation S270. The image forming unit 400 overlaps the images for the first channel and the second channel, and forms a halftone image in black color.

Meanwhile, if the multi-bit halftoning process which uses the second developer is selected at operation S280, the image forming unit 400 sets the sizes of dots of the second developer by each level based on the number of preset halftoning bits at operation S290. Here, the number of halftoning bits is preset for the image forming apparatus 1 or may be changed by a user.

The image forming unit 400 forms a halftone image with the second developer in proportion to the density of the image of the input data on the basis of the size of a dot set for each level at operation S300. For example, the high density area is formed with larger dots while the low density area is formed with smaller dots.

As described above, the multi-bit halftoning process which uses the second developer may minimize a difference in quality of the halftone image from the single-bit halftoning process which uses the respective developers.

If the halftone image in black color is formed by the single-bit halftoning or the multi-bit halftoning process, the image forming unit 400 forms halftone images in cyan, magenta and yellow colors through similar processes. Here, as the brightness value of a yellow color is not clear in level as compared to other colors, the process described above may apply to cyan, magenta, and black colors, except for the yellow color.

The image forming unit 400 forms the final image on a print medium by using the halftone images in respective colors at operation S310.

In an exemplary embodiment, if the remaining amount of the first developer is not the preset value, the single-bit halftoning process which uses the respective developers is performed (refer to FIG. 4). However, the spirit of the present invention is not limited to the foregoing. For example, the first process of the multi-bit halftoning process which uses the second developer is performed if the remaining amount of the first developer is not the preset value or less. Or, if the remaining amount of the first developer is the preset value or less, the second process of the multi-bit halftoning process which increases the number of the halftoning bits rather than the first process may be performed.

Figure 5:
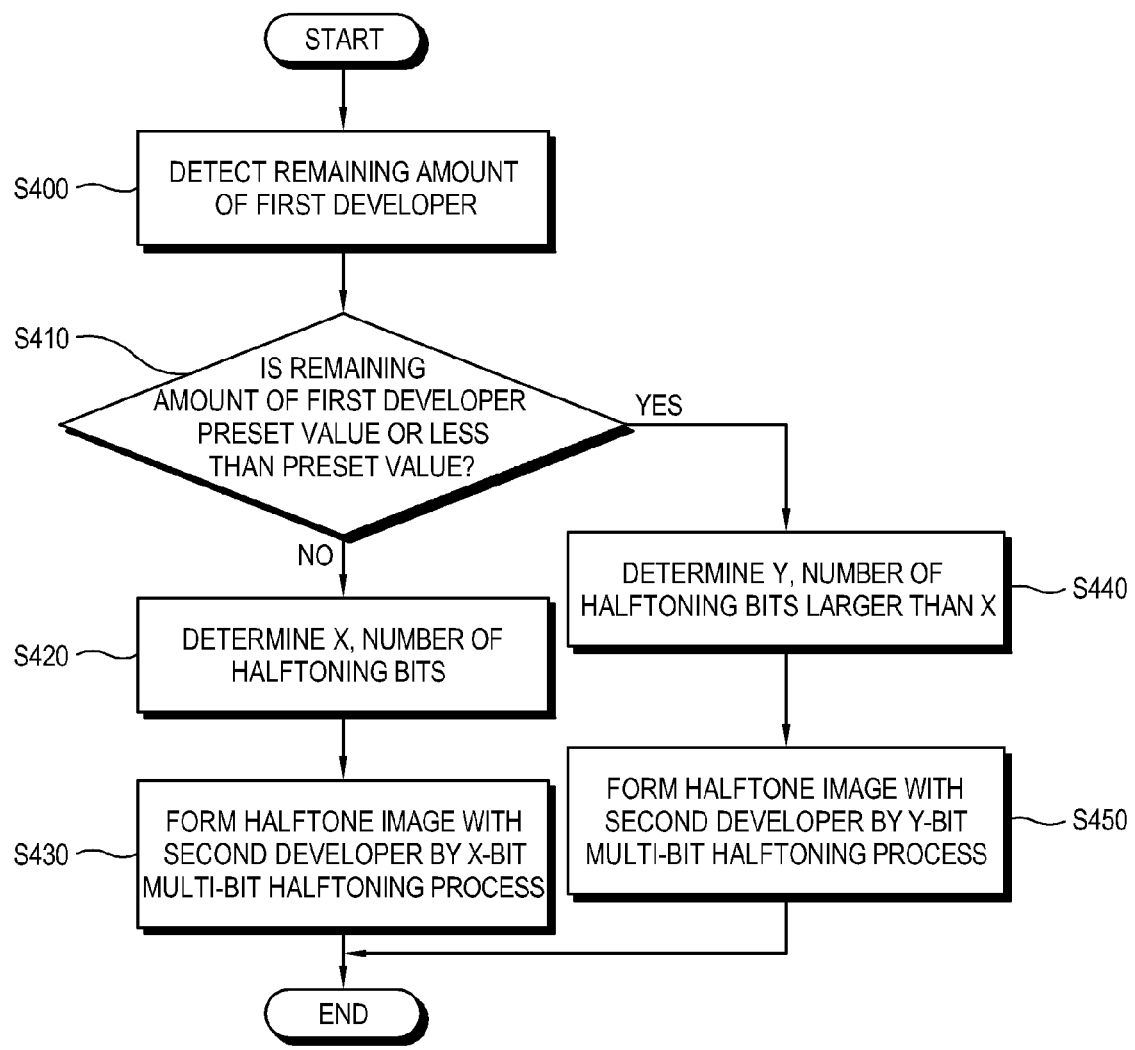
FIG. 5 is a control flowchart which describes a process of performing a multi-bit halftoning process using the second developer depending on the remaining amount of a first developer, in an image forming apparatus according to another exemplary embodiment of the present general inventive concept.

An image forming apparatus according to another exemplary embodiment of the present general inventive concept will be described with reference to FIG. 5. FIG. 5 is a control flowchart which describes the multi-bit halftoning process using the second developer. To clarify this exemplary embodiment, the single-bit halftoning process using the first developer is not shown in the drawing.

As shown in FIG. 5, the detector unit 300 detects the remaining amount of the first developer S400, and the image forming unit 400 determines whether the remaining amount of the first developer is the preset value or less than the preset value at operation S410.

If it is determined that the remaining amount of the first developer is not the preset value or less than the preset value, the image forming unit 400 divides the input data into the first channel corresponding to the first developer and the second channel corresponding to the second channel. The image of the second channel is formed by the multi-bit halftoning process, and the amount of data allotted to the second channel is relatively larger than that of the single-bit halftoning process.

The image forming unit 400 determines X, the number of halftoning bits, to perform the multi-bit halftoning process with the second developer at operation S420. The image forming unit 400 forms a halftone image with the second developer according to the multi-bit halftoning process of X-bits at operation S430. More specifically, the image forming unit 400 forms an image of the first channel with the first developer according to the single-bit halftoning process, and forms the image of the second channel with the second developer according to the multi-bit halftoning process of X-bits to thereby form the halftone image with the images of the respective channels.

If it is determined that the remaining amount of the first developer is the preset value or less than the preset value, the image forming unit 400 determines Y, the number of halftoning bits to be larger than X at operation S440. The image forming unit 400 forms the halftone image with the second developer according to the multi-bit halftoning process of Y-bits at operation S450.

As described above, the multi-bit halftoning process which uses the second developer may be selectively applicable by adjusting the number of halftoning bits based on the remaining amount of the first developer.

According to embodiments of the present general inventive concept, an image forming apparatus which forms halftone images with first and the second developers having similar colors and different densities performs a multi-bit halftoning process with the second developer if the remaining amount of the first developer is a preset value or less. Thus, even if the first developer is used up, deterioration of image quality can be minimized.

If the remaining amount of the first developer is not the preset value or less than the preset value, images of each channel are formed according to single-bit halftoning processes with respective developers and then overlap them to form a halftone image. By doing so, a slight difference in brightness, which has been difficult to express in a digital process, is more clearly expressed, resulting in improving the image quality.

As the multi-bit halftoning process or the single-bit halftoning process are selectively used on the basis of the remaining amount of the first developer, the image quality is secured and resources are wasted at a minimum.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. An image forming method of an image forming apparatus, the image forming method comprising:
    detecting the remaining amount of a first developer; and
    forming an image expressing continuous gray levels of input data according to a multi-bit halftoning process using a second developer, similar in color to the first developer and higher in density than the first developer if the detected remaining amount of the first developer is a preset value or less.

2. The image forming method according to claim 1, wherein the forming the image comprises:
    setting sizes of dots of the second developer corresponding to each gray level; and
    forming the dots of the second developer in the sizes set for each gray level, in proportion to the image density of the input data.

3. The image forming method according to claim 1, wherein the forming the image further comprises:
    forming an image expressing continuous gray levels of the input according to single-bit halftoning processes using the first and the second developers if the remaining amount of the first developer is not the preset value or less.

4. The image forming method according to claim 3, wherein the forming the image expressing the continuous gradations of the inputted data according to the single-bit halftoning process comprises:
    dividing the gradation information of the input into channels corresponding to the first and the second developers, respectively; and
    forming images of the divided channels with the first and the second developers and overlapping the images of the channels.

5. The image forming method according to claim 1, wherein the forming the image comprises:
    performing a first process of the multi-bit halftoning process using the second developer if the remaining amount of the first developer is not the preset value or less; and
    performing a second process of the multi-bit halftoning process with the second developer by increasing the number of halftoning bits higher than in the first process if the remaining amount of the first developer is the preset value or less.

6. The image forming method according to claim 5, wherein the sizes of dots of the second developer increase as the number of the halftoning bits increases.

7. An image forming apparatus comprising:
    a developer supplying unit to store therein a first developer and a second developer that is similar in color to the first developer and higher in density than the first developer;
    a detector unit which detects the remaining amount of the first developer stored in the developer supply unit; and
    an image forming unit which forms an image expressing continuous gray levels of input data according to a multi-bit halftoning process using the second developer stored in the developer supply unit.

8. The image forming apparatus according to claim 7, wherein the image forming unit sets sizes of dots of the second developer for each gray level and forms the dots of the second developer in the sizes set for each gray level, in proportion to the image density of the inputted data.

9. The image forming apparatus according to claim 7, wherein the image forming unit forms an image expressing continuous gray levels of input according to single-bit halftoning processes using the first and the second developers if the remaining amount of the first developer is not the preset value or less.

10. The image forming apparatus according to claim 9, wherein the image forming unit divides continuous gray level information of the input data into channels corresponding to each of the first and the second developers, and forms images of the divided channels with the first and second developers to overlap each other.

11. The image forming apparatus according to claim 7, wherein the image forming unit performs a first process of a multi-bit halftoning process which uses the second developer if the remaining amount of the first developer is not a preset value or less, and performs a second process of a multi-bit halftoning process with the second developer by increasing the number of halftoning bits higher than in the first process if the remaining amount of the first developer is the preset value or less.

12. The image forming apparatus according to claim 11, wherein the image forming unit increases the size of dots of the second developer as the halftoning bits increase.

13. An image forming apparatus comprising:
    a first developer cartridge which comprises a first developer;
    a second developer cartridge which comprises a second developer similar in color to, and higher in density than, the first developer; and
    a controller which converts a single-bit halftoning process using the first developer to a multi-bit halftoning process using the second developer.

14. The image forming apparatus according to claim 13, wherein the first and the second developer cartridges respectively comprise a first detector and a second detector units which detect the remaining amounts of the first developer and the second developer, respectively.

15. The image forming apparatus according to claim 14, wherein a point of time when the single-bit halftoning process is converted into the multi-bit halftoning process is determined on the basis of a value detected by the first detector unit that detects the remaining amount of the first developer.

16. The image forming apparatus according to claim 14, wherein the first detector unit employs at least one of a photo sensor, a piezo-electric sensor, a torque sensor, an electric-capacity detecting sensor and a dot counting sensor, in order to detect the remaining amount of the first developer.

17. The image forming apparatus according to claim 13, further comprising:
    at least one of a display device which displays thereon operations of the image forming apparatus and an input device which receives a user's input.

18. The image forming apparatus according to claim 17, wherein the single-bit halftoning process is converted into the multi-bit halftoning process at a point of time when a user selects the display device or the input device.

19. The image forming apparatus according to claim 13, wherein the developer cartridges are detachable and the number of the developing cartridges is at least five.

20. An image forming method of an image forming apparatus, the image forming method comprising:
   determining the remaining amount of a first developer having a predetermined color; and
   forming an image according to a multi-bit halftoning process which uses a second developer that is similar in color to the first developer and higher in density than the first developer with respect to a brightness being higher than a preset value among continuous grayscale images, corresponding to a color of the first developer if it is determined that the first developer is used up.

21. The image forming method according to claim 20, wherein the image forming apparatus comprises a plurality of developers having a plurality of colors, and
   the first developer and the second developer correspond to at least one of the plural colors of the developers.

* * * * *